United States Patent [19]

Berube et al.

[11] Patent Number: 4,738,195
[45] Date of Patent: Apr. 19, 1988

[54] FRUIT PEELING MACHINE

[76] Inventors: James A. Berube, Moss Point Trail, Old Lyme, Conn. 06371; W. Garrett Howard, 1671 W. Main St., Willimantic, Conn. 06226

[21] Appl. No.: 15,686

[22] Filed: Feb. 17, 1987

[51] Int. Cl.⁴ .................. A23N 7/00; A47J 17/00
[52] U.S. Cl. ........................... 99/591; 99/537; 99/588; 99/590
[58] Field of Search ............ 99/537, 543, 584, 586, 99/589, 591, 590, 595, 587; 83/883, 437, 451, 857; 30/299, 91.1, 121.5, 296 R, 299, 123.5

[56] References Cited

U.S. PATENT DOCUMENTS

| | | |
|---|---|---|
| 419,722 | 1/1890 | Siersdorfer . |
| 943,249 | 12/1909 | Johansan . |
| 1,001,931 | 8/1911 | Cookson . |
| 1,075,031 | 10/1913 | Ginaca . |
| 1,237,251 | 8/1917 | Lyng . |
| 2,277,003 | 3/1942 | Polk, Jr. . |
| 2,396,444 | 3/1946 | Singer . |
| 2,521,115 | 9/1950 | Calkins . |
| 3,830,151 | 8/1974 | Gerson .................. 99/537 |
| 3,921,287 | 11/1975 | Gomez .................. 30/280 |
| 3,961,418 | 6/1976 | Neveu .................. 30/123.5 |
| 4,446,782 | 5/1984 | Black .................. 99/591 X |
| 4,545,297 | 10/1985 | Ihlow .................. 99/586 |

Primary Examiner—Timothy F. Simone
Attorney, Agent, or Firm—Ira S. Dorman

[57] ABSTRACT

A machine for cutting strips of peel from citrus fruit, particularly for the purpose of producing "twists" of lemon and lime, employs a cutting assembly with a circular array of cutters. The cutters have upwardly oriented, transversely extending cutting edges to simultaneously produce a multiplicity of peel strips; they are biased to radially inward positions, and are automatically retractable so as to accommodate passage of the fruit axially between them. The machine includes a cup for receiving and permitting the convenient retrieval of the fruit and strips from the machine, and normally a plunger mechanism will be provided for manually forcing the fruit through the array of cutters.

18 Claims, 3 Drawing Sheets

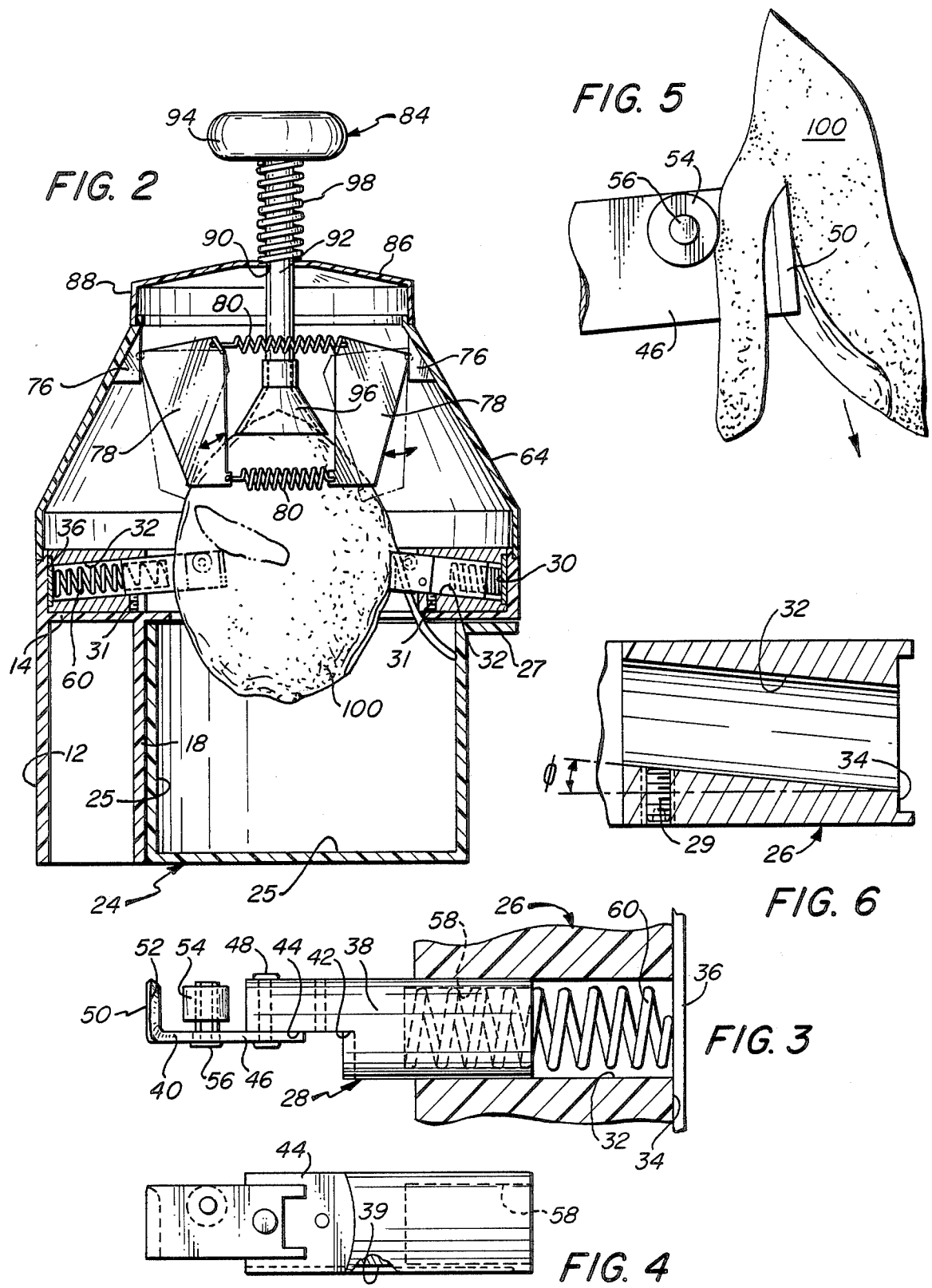

FRUIT PEELING MACHINE

BACKGROUND OF THE INVENTION

A considerable amount of time is spent by bartenders, and others who are employed at cocktail lounges, restaurants and the like, in removing peel from citrus fruits, particularly lemons and limes, for use as "twists" for beverages. Machines have been proposed in the past to facilitate this and similar tasks, as evidenced by the following United States Patents:

U.S. Pat. No. 419,722, to Siersdorfer, discloses an apple corer and slicer, in which a plunger mechanism is used to force the apple downwardly over a cylindrical "gouge" and a set of radial blades.

Jahansan U.S. Pat. No. 943,249 provides a paring machine in which an array of cutting assemblies surround the path of movement of the potato to be peeled. Each assembly includes a pair of rollers and a blade having an upwardly angled cutting edge, the rollers serving to follow the surface of the potato and to limit penetration of the blade element; in the version of FIGS. 6 and 7, a single-level roller effect, provided by a pair of side-by-side rolls, is shown.

U.S. Pat. Nos. 1,001,931, to Cookson and 1,075,031, to Gianca both provide devices for use in connection with the cutting of pineapples. In Lyng U.S. Pat. No. 1,237,251, a potato peeling machine is disclosed in which the blades are disposed on the free ends of each of a circular array of inwardly extending spring-like arms, peeling being effected as the potato is forced downwardly along the axis of the machine hopper.

Polk, Jr. U.S. Pat. Nos. 2,277,003 and Singer 2,396,444 both show devices for peeling fruit, wherein blade and knife elements function to slice and then peel away the rind.

A corn shreader is described in Calkins U.S. Pat. No. 2,521,115, which consists of a set of radially inwardly projecting spring stee) blades mounted upon a ring-like holder. Gerson U.S. Pat. No. 3,830,151 shows a device for sectioning lemons, tomatoes, and the like, utilizing a conical array of radial blades through which the fruit or vegetable is forced.

A hand peeler for fruit is provided by Gomez U.S. Pat. No. 3,921,287, in which a curved blade is mounted on a pivotable head between a pair of rollers; it may be used to produce peel for drinks. Ihlow U.S. Pat. No. 4,545,297 discloses an onion peeling device which employs a set of pivotable arms, arranged in a circle and biased inwardly; a knife element on the upper end of each arm slits the outer skin, which is then peeled away by an adjacent end plate.

Despite the activity in the art indicated by the foregoing, a demand remains for a machine that is capable of quickly and efficiently cutting peel from fruit in strips, which is relatively uncomplicated and inexpensive to manufacture, easy to clean and assemble, and sufficiently durable to adequately withstand extensive use under commercial conditions.

Accordingly, it is an object of the present invention to provide a novel machine for cutting peel strips from fruit, which is highly efficient and yet convenient and easy to use.

It is a more specific object of the invention to provide such a machine which is of uncomplicated construction, rendering it relatively facile and inexpensive to manufacture and easy to disassemble and assemble for ready cleaning and, if necessary, replacement of parts.

A further object of the invention is to provide a machine having the foregoing features and advantages, which is inherently capable of accommodating different kinds and sizes of fruit.

Another object of the invention is to provide such a machine in which the strips of peel produced are of a uniform nature, and are neatly and conveniently collected and recovered.

SUMMARY OF THE INVENTION

It has now been found that the foregoing and related objects of the invention are readily obtained in a machine comprising, in combination, a housing having a receptacle portion therewithin, a blade assembly supported upon the housing over the receptacle portion, and means for forcing a piece of fruit through the blade assembly. The blade assembly includes a holder having a central opening and a multiplicity of bores extending radially outwardly from the opening, the bores also desirably extending downwardly at a slight angle with respect to a common plane. The assembly also includes a multiplicity of cutters slidably mounted within the bores of the holder, and means for biasing the cutters inwardly. Each cutter has an elongated body portion slidably seated within an associated bore of the holder, for substantially radial reciprocation, a blade element projecting from the body portion into the holder opening, and a depth guide element disposed closely adjacent to the blade element and radially cutwardly from it. An upwardly oriented cutting edge, extending generally transversely of the longitudinal axis of the body portion, is provided on each blade element. The blade elements are disposed in a circular array and in such position that a piece of fruit forced downwardly through the holder opening will contact the cutting ed9es substantially simultaneously; as a result, the cutting edges and the guide elements will cooperatively cut a multiplicity of strips from the fruit, for receipt within the receptacle portion.

In the preferred embodiments, the depth guide of each cutter will comprise a roller mounted to rotate on an axis generally parallel to the associated cutting edge and the blade element will advantageously be a separate, generally L-shaped piece. More particularly, it will be comprised of two generally rectilinear, perpendicular legs, one having the cutting edge formed on it and mounting the roller, and the other being secured to the body portion of the cutter and providing the means by which the blade element is attached.

Most desirably, the holder of the blade assembly will include a body of annular form, having bores that open on its inner and outer circumferential edge surfaces. It may include a retaining band secured about the outer edge surface of the body, for the purpose of closing the ends of the bores, and the biasing means may consist of a multiplicity of coil springs disposed within the bores and bearing upon the retaining band.

Normally, the blade elements of the cutters will be equidistantly angularly spaced in the array, and there will be at least 12 of them; 16 cutters will often prove to be optimal. The angle at which the bores extend, with respect to the common plane, will typically be about five degrees.

In most instances, the machine will additionally include a cover assembly mounted upon the housing, such an assembly being comprised of a generally upstanding wall defining a compartment over the blade assembly and having an opening aligned with that of the holder. The assembly will normally provide guide means, disposed within the compartment formed by the upstanding wall, to define a path extending generally between the openings of the wall and the blade assembly holder. The path will desirably be of diminishing cross section, and the guide means provided will be capable of elastic expansion for increasing the normal dimensions. A plurality of rigid components, elastically interconnected and defining channel portions of inwardly diminishing cross section, will conveniently provide the guide means.

A manually operated plunger subassembly will normally also be included as part of the cover assembly, and will comprise a cap dimensioned and configured to disengagably seat over the opening of the upstanding wall, and a plunger extending through the cap and adapted for reciprocal movement substantially along the path defined. The plunger will have a lower end portion configured to engage a piece of fruit so as to best adapt it for forcing the fruit through the blade assembly. The housing may be formed to define a laterally opening space beneath the blade assembly, with the machine including a collecting cup. The cup will be adapted to pass through the lateral opening for removable containment within the underlying space, to provide the desired receptacle portion.

BRIEF DESCRIPTION OF THE DRAWINGS

FIG. 2 is a vertical cross-sectional view of the machine of FIG. 1, showing a lemon being forced through the cutting assembly and also showing, in phantom line, the deflection of the guide plates necessary to permit passage of the fruit;

FIG. 3 is a plan view of a cutter utilized in the machine of the invention, mounted within the annular holder body (fragmentarily illustrated) and drawn to a scale enlarged from that of the previous Figures;

FIG. 4 is a side elevational view of the cutter, drawn to the scale of FIG. 3;

FIG. 5 is a fragmentary elevational view showing the cutter in the process of stripping peel from the fruit, drawn to a further enlarged scale;

FIG. 6 is a sectional view of the holder body employed in the machine, taken along line 6—6 of FIG. 7 and drawn to the scale of FIGS. 3 and 4;

DETAILED DESCRIPTION OF THE ILLUSTRATED EMBODIMENTS

Figure 1:
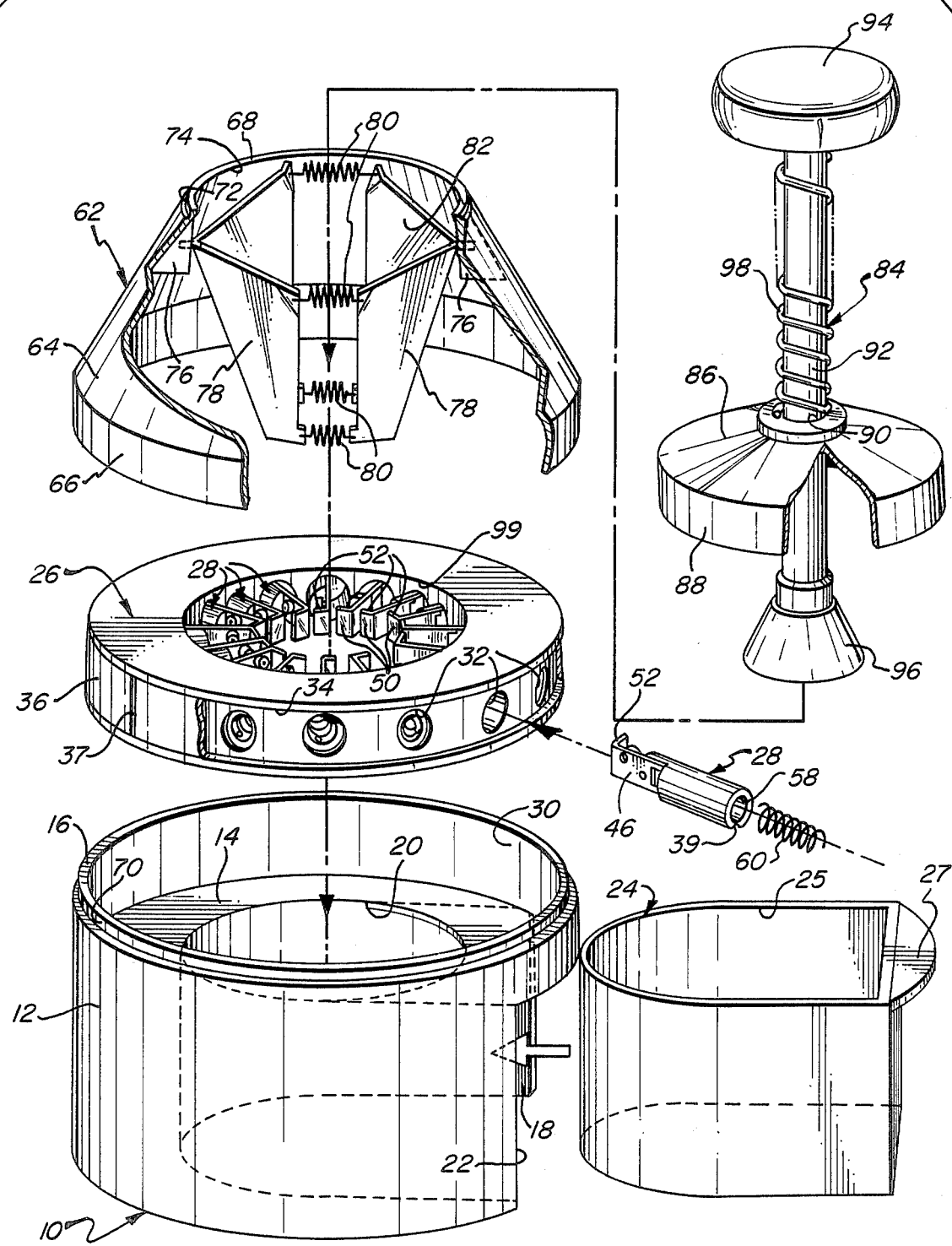
FIG. 1 is an exploded perspective view of a machine embodying the present invention, with portions broken away for clarity of illustration.
Figure 7:
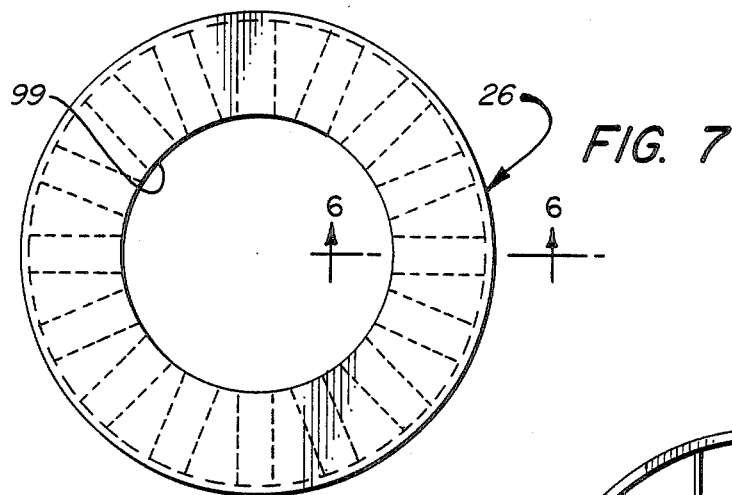
FIG. 7 is a plan view of the holder body.

Turning now in detail to FIGS. 1-7 of the drawings, therein illustrated is a machine embodying the present invention and including a round base, generally designated by the numeral 10. The base has a cylindrical outside wall 12, an annular shelf 14 spaced downwardly from the upper edge 16, and a U-shaped internal wall 18 partially surrounding the central opening 20 of the annular shelf portion 16 and defining a lateral opening 22 in cooperation with the outside wall 12. A cup, generally designated by the numeral 24 and of corresponding U-shaped cross section, is adapted to slide through the lateral opening 22 and seat within the space defined by the interior wall 18, to position it beneath the circular opening 20 for the receipt of fruit and peel processed by the machine.

The blade assembly employed in the machine consists of an annular or ring-like holder, generally designed by the numeral 26, and a multiplicity of cutters, each generally designated by the numeral 28. The diameter and depth of the recess 30, formed within the upper end of the base 10 by the outside wall 12 and the annular ledge 14, adapt it to securely seat the holder in a close fitting relationship, as is best seen in FIG. 2.

Sixteen rectilinear bores 32, of circular cross section, extend radially through the holder 26 at equidistantly angularly spaced locations thereabout, and they extend at an angle (represented by the Greek letter phi in FIG. 6) of approximately five degrees to a common plane; the machine will usually be used so that the fruit moves vertically, with the holder in a horizontal orientation, and thus the inclination of the bores can normally be expressed with reference to horizontal. The outer edge of the holder 26 is formed with a shallow circumferential groove 34, within which is seated a metal band 36. The band 36 is split at 37 to permit it to be disengagably mounted (inherent resiliency enabling it to grip the holder and to be expanded for removal), and it serves to close the outer ends of the bores 32; this construction facilitates assembly of the cutters 28 with the holder 26, as will be self-evident.

Each cutter 28 consists of an elongated cylindrical body 38 and an L-shaped blade element 40. The inner end of the body 38 is notched at 42, providing a flat surface 44 against which one of the legs 46 of the blade element 40 is secured by a rivet 48. The perpendicular leg 50 of the blade element is honed along its upper edge, to provide a cutting edge 52 extending transversely (perpendicularly in this instance) to the longitudinal axis of the body 38. A small roller 54 is mounted by a stub axle 56 on the leg 46 of the blade element, between the transverse leg 50 and the adjacent end of the body 38; the position of the roller 54 with respect to the cutting edge 52 is gauged to approximate typical lemon rind thickness.

A slot or keyway 39 extends longitudinally along the bottom of the cutter body 38. The holder 26 has a small tapped aperture 29 opening into each bore 32 from the underside, within which is threaded a set screw 31. The screws 31 are adjusted to project into the bores 32 a distance sufficient to engage within the slot 39 of the inserted cutter body 38, without interfering with its radial movement. In this way the cutters are mounted for free sliding action, while being engaged against rotation so as to ensure that the proper upward orientation of the cutting edges 52 will be maintained during operation.

A blind bore 58 extends axially into the outer end of the body 38, and serves to seat an end portion of a coil spring 60. The opposite end of the spring bears upon the inner surface of the encircling band 36, and accordingly serves to exert an inward bias to the associated cutter 28.

The lower cover subassemby, generally designated by the numeral 62, consists of a frustoconical wall portion 64 having a short cylindrical skirt portion 66 and lip portion 68 extending axially from its opposite ends. The skirt portion 66 fits within the circumferential rim groove 70 at the top of the base sidewall 12, and the lip 68 cooperatively defines a similar rim groove 72 at the top of the frustoconical wall 64; it also defines a circular feed opening 74.

A pair of small triangular ears 76 are diametrically affixed somewhat below the feed opening 74, and serve to pivotably support angle plates 78; the plates 78 taper inwardly, and are disposed in mirror image relationship to cooperatively define a tapered passageway 82, as best seen in FIG. 1. Four coil springs 80 are attached between corresponding corners of the angle plates 78, and serve to hold them in a normal, relatively close relationship to one another; the springs 80 permit resilient deflection for enlargement of the cross section of the passageway 82.

A plunger subassembly, generally designated by the numeral 84, is mounted upon the frustoconical sidewall 62, and has a cap 86 with a circumferential skirt portion 88 that seats within the rim shoulder 72 for that purpose. The upper wall of the cap has a central aperture 90, within which is slidably engaged the shaft 92 of a plunger, the latter having a disk-like knob 94 and a frustoconical socket piece 96 on its upper and lower ends, respectively. A coil spring 98 extends about the shaft 92, in the length between the knob 94 and the cap 86, and exerts an upward bias upon the plunger.

As will now be self-evident, the machine is utilized simply by removing the plunger subassembly 84 from the lower cover subassembly 62, and inserting the piece of fruit 100 through the feed opening 74. The plunger subassembly is then replaced, and downward force is applied to the knob 94 to move the fruit between the spring-biased angle plates 78, to guide it through the passageway 82 and into the axially aligned circular opening 99 of the annular holder 26, the plates 78 spreading as necessary to accommodate passage; this action is indicated by the phantom line representation and the double-headed arrows in FIG. 2. When the fruit encounters the upwardly oriented cutting edges 52 of the blade elements 40, which are biased to their most inward positions, cutting of 16 pieces of peel is initiated; the slightly upward orientation of the cutters significantly improves the effectiveness of slicing. Ultimately, both the fruit and the peel strips drop into the cavity 25 of the cup 24, and can be retrieved by grasping the handle element 27 and sliding the cup from under the base 10.

As will be appreciated, in such an operation the cutters will remove peel from only the hemisphere of the fruit initially presented to them. Additional peel can of course be produced by inverting the fruit and passing it through the machine a second time.

Figure 8:
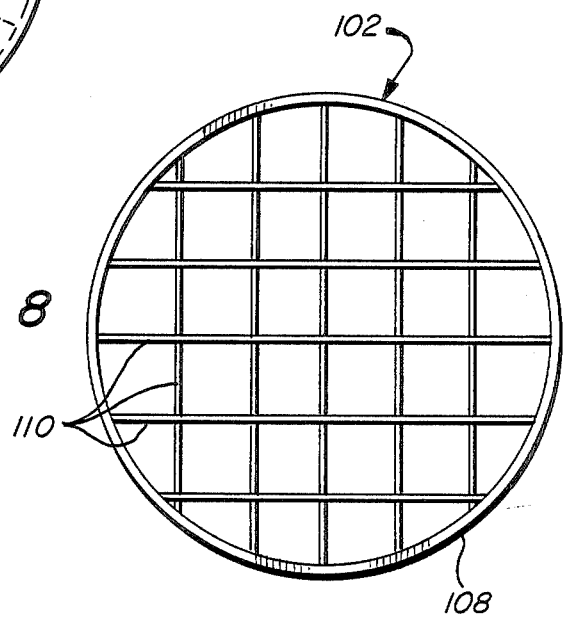
FIGS. 8 and 9 show accessory inserts which may be used in place of the cutter assembly for slicing purposes.
Figure 9:
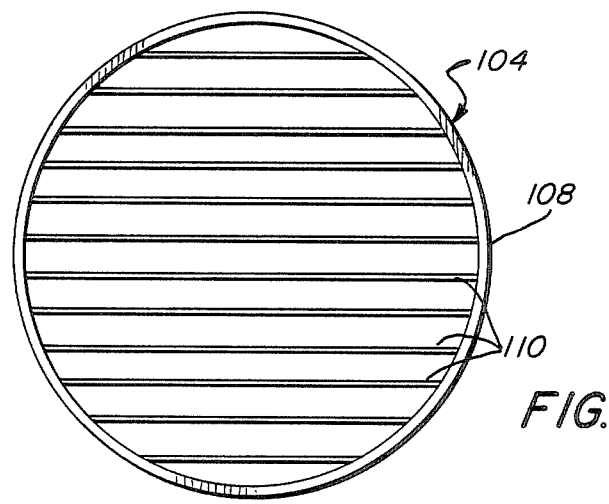

FIGS. 8 and 9 represent accessory inserts that can be used with the machine of the invention, modified by removal of the cutter assembly. Each consists of a ring-like frame 106, across the opening of which spans a set of blades 108. In the embodiment of FIG. 8, the blades are arranged in a grid-like pattern, the insert being adapted for cutting square pieces. The form of accessory shown in FIG. 9 utilizes parallel blades 108, and can be used to produce orange slices, or the like.

Although the details of construction of the machine of the invention will be evident to those skilled in the art, it might be mentioned that, other than the coil springs and blades, plastic parts may advantageously be utilized throughout. The number of blades can of course vary, but generally at least 12 will be utilized; 16 will often produce optimal results from the standpoint of providing appropriate spacing for maximizing the amount of peel of suitable width produced from a lemon, consistent with facile operation and good cutting efficiency. The blades will usually be equidistantly spaced from one another, so as to provide good balance and reliable operation, but this need not necessarily be the case; the angle of inclination (if any) also deviate, although an orientation of about 5° is found to afford highly desirable operation. Finally, although the illustrated machine is manually operated, power-driven models may be provided pursuant to the invention, as will be evident to those skilled in the art.

Thus, it can be seen that the present invention provides a novel machine for cutting peel strips from fruit, which is highly efficient and yet convenient and easy to use. The machine is of uncomplicated construction, rendering it relatively facile and inexpensive to manufacture, and is easy to disassemble and reassemble for ready cleaning and, if necessary, replacement of parts. Different kinds and sizes of fruit are inherently accommodated by the machine, and the strips of peel produced are of a uniform nature and are conveniently collected and recovered.

Having thus described the invention, what is claimed is:

1. In a machine for cutting peel strips from fruit, the combination comprising: a housing having a receptacle portion therewithin; a blade assembly supported upon said housing over said receptacle portion; and means for forcing a piece of fruit through said blade assembly toward said receptacle portion, said blade assembly including:

a holder having a central opening, and a multiplicity of bores extending thereinto radially outwardly from said opening; a corresponding multiplicity of cutters slidably mounted within said bores of said holder; and means for inwardly biasing said cutters; each of said cutters having an elongated body portion slidably seated within an associated one of said bores for substantially radial reciprocation, a blade element projecting therefrom into said holder opening, and a depth guide element disposed closely adjacent thereto and radially outwardly thereof, each of said blade elements having an upwardly oriented cutting edge thereon extending generally transversely of the longitudinal axis of the associated body portion, said multiplicity of cutters providing a circular array of said blade elements disposed so that a piece of fruit forced downwardly through said holder opening will contact said cutting edges substantially simultaneously, whereby said cutting edges and said guide elements will cooperatively cut a multiplicity of strips of peel therefrom, in a single action, for receipt by said receptacle portion.

2. The machine of claim 1 wherein said cutting edges are substantially rectilinear, and wherein said depth guide of each cutter comprises a roller mounted to rotate on an axis generally parallel to that of the associated one of said cutting edges, said cutters having means cooperating with said holder for affixing them against rotation within said bores.

3. The machine of claim 2 wherein said blade element is a separate, generally L-shaped piece comprised of two substantially rectilinear and perpendicular legs, one of said legs having said cutting edge formed theren and mounting said roller, the other of said legs being secured to said body portion for attachment of said blade element.

4. The machine of claim 1 wherein said holder includes a body of annular form, and wherein said bores extend entirely therethrough and open on inner and outer circumferential edge surfaces thereof, said holder also including a retaining band secured about said body upon said outer edge surface and closing the ends of said bores thereat, said biasing means comprising a coil spring disposed within each of said bores and bearing upon the overlying surface of said retaining band and upon the associated cutter body portion.

5. The machine of claim 1 wherein said blade elements are equidistantly angularly spaced in said array.

6. The machine of claim 5 wherein there are at least twelve of said cutters.

7. The machine of claim 6 wherein said bores extend downwardly from said opening of said holder at an angle of about five degrees.

8. The machine of claim 1 additionally including a cover assembly mounted upon said housing, said cover assembly being comprised of a generally upstanding wall defining a compartment over said blade assembly and an opening thereinto axially aligned with said holder opening, and guide means disposed within said compartment and defining a path generally between said wall opening and holder opening.

9. The machine of claim 8 wherein said guide means is capable of elastic expansion for increasing the cross-sectional dimensions of said path from those that exist in a normal position, and wherein in said path defined by said guide means in said normal position is of inwardly diminishing cross section.

10. The machine of claim 9 wherein said guide means comprises a plurality of rigid components elastically interconnected and defining channel portions of inwardly diminishing cross section.

11. The machine of claim 8 wherein said cover assembly additionally includes a plunger subassembly, said subassembly comprising a cap dimensioned and configured to disengageably seat upon said upstanding wall over said opening thereof, and a plunger extending through said cap and adapted for reciprocal movement substantially along said path, said plunger having a lower end portion configured to engage a piece of fruit for so forming it through said blade assembly.

12. The machine of claim 12 wherein said housing defines an underlying space beneath said blade assembly and a lateral opening thereinto, and additionally includes an upwardly opening collecting cup adapted to pass through said lateral opening for removable containment within said underlying space, said cup providing said receptacle portion.

13. In a machine for cutting peel strips from fruit, the combination comprising: a housing having a receptacle portion therewithin; a blade assembly supported upon said housing over said receptacle portion; and means for forcing a piece of fruit through said blade assembly toward said receptacle portion, said blade assembly including:

a holder having a central opening, and a multiplicity of at least 12 bores equidistantly angularly spaced and extending thereinto radially outwardly from said opening and downwardly at a slight angle with respect to a common plane; a corresponding multiplicity of cutters slidably and nonrotatably mounted within said bores of said holder; and means for inwardly biasing said cutters;

each of said cutters having an elongated body portion slidably seated within an associated one of said bores for substantially radial reciprocation, a blade element projecting therefrom into said holder opening, and a depth guide element disposed closely adjacent thereto and radially outwardly thereof, each of said blade elements having an upwardly oriented cutting edge thereon extending generally transversely of the longitudinal axis of the associated body portion, said multiplicity of cutters providing a circular array of said blade elements disposed so that a piece of fruit forced downwardly through said holder opening will contact said cutting edges substantially simultaneously, whereby said cutting edges and said guide elements will cooperatively cut a multiplicity of strips of peel therefrom, in a single action, for receipt by said receptacle portion.

14. The machine of claim 13 wherein said cutting edges are substantially rectilinear, and wherein said depth guide of each cutter comprises a roller mounted to rotate on an axis generally parallel to that of the associated one of said cutting edge.

15. The machine of claim 13 wherein said holder includes a body of annular form, and wherein said bores extend entirely therethrough and open on inner and outer circumferential edge surfaces thereof, said holder also including a retaining band secured about said body upon said outer edge surface and closing the ends of said bores thereat, said biasing means comprising a coil spring disposed within each of said bores and bearing upon the overlying surface of said retaining band and upon the associated cutter body portion.

16. In a machine for cutting peel strips from fruit, the combination comprising: a housing having a receptacle portion therewithin; a blade assembly supported upon said housing over said receptacle portion; and a cover assembly mounted upon said housing and including a plunger subassembly for forcing a piece of fruit through said blade assembly toward said receptacle portion said blade assembly including:

a holder having a central opening, and a multiplicity of bores extending thereinto radially outwardly from said opening; a corresponding multiplicity of cutters slidably mounted within said bores of said holder; and means for inwardly biasing said cutters;

each of said cutters having an elongated body portion slidably seated within an associated one of said bores for substantially radial reciprocation, a blade element projecting therefrom into said holder opening, and a depth guide element disposed closely adjacent thereto and radially outwardly thereof, each of said blade elements having an upwardly oriented cutting edge thereon extending generally transversely of the longitudinal axis of the associated body portion, said multiplicity of cutters providing a circular array of said blade elements disposed so that a piece of fruit forced downwardly through said holder opening will contact said cutting edges substantially simultaneously, whereby said cutting edges and said guide elements will cooperatively cut a multiplicity of strips of peel therefrom, in a single action, for receipt by said receptacle portion.

17. The machine of claim 16 wherein said cover assembly is comprised of a generally upstanding wall defining a compartment over said blade assembly and an opening thereinto axially aligned with said holder opening, and guide means disposed within said compartment and defining a path generally between said wall opening and holder opening.

18. The machine of claim 17 wherein said subassembly comprises a cap dimensioned and configured to disengageably seat upon said upstanding wall over said opening thereof, and a plunger extending through said cap and adapted for reciprocal movement substantially along said path, said plunger having a lower end portion configured to engage a piece of fruit for so forcing it through said blade assembly.

* * * * *

UNITED STATES PATENT AND TRADEMARK OFFICE
CERTIFICATE OF CORRECTION

PATENT NO. : 4,738,195
DATED : April 19, 1988
INVENTOR(S) : JAMES A. BERUBE ET AL It is certified that error appears in the above-identified patent and that said Letters Patent is hereby corrected as shown below:

On the cover page, delete the address for inventor Howard, and substitute therefor:

-- 85 N. Main Street
Unit 40
East Hampton, CT 06424 --;

Line 1, column 7, delete "edde" and substitute therefor --edge--;

Line 40, column 7, delete "forming" and substitute therefor --forcing--;

Line 31, column 8, insert a comma after "portion".

Signed and Sealed this

Eighth Day of November, 1988

Attest:

DONALD J. QUIGG

*Attesting Officer*    *Commissioner of Patents and Trademarks*